(12) United States Patent
Chang et al.

(10) Patent No.: US 7,435,119 B2
(45) Date of Patent: Oct. 14, 2008

(54) ELECTRICAL CARD CONNECTOR BACKGROUND OF THE INVENTION

(75) Inventors: Wei-Cheng Chang, Tu-Cheng (TW); Chien-Jen Ting, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/980,060

(22) Filed: Oct. 30, 2007

(65) Prior Publication Data

US 2008/0102680 A1    May 1, 2008

(30) Foreign Application Priority Data

Oct. 30, 2006    (TW) .............................. 95219116 U

(51) Int. Cl.
*H01R 29/00* (2006.01)
(52) U.S. Cl. ...................................... 439/188; 439/326
(58) Field of Classification Search ................ 439/326, 439/328, 325, 188; 200/51.09
See application file for complete search history.

(56) References Cited

U.S. PATENT DOCUMENTS

| | | | |
|---|---|---|---|
| 4,547,138 A * | 10/1985 | Mabe et al. ................. | 418/55.6 |
| 5,655,917 A | 8/1997 | Kaneshige et al. | |
| 5,996,891 A | 12/1999 | Braun | |
| 6,062,889 A * | 5/2000 | Hyland et al. ................ | 439/326 |
| 6,210,193 B1 | 4/2001 | Ito et al. | |
| 6,220,882 B1 | 4/2001 | Simmel et al. | |
| 6,663,408 B2 * | 12/2003 | Sato ........................... | 439/331 |
| 6,869,302 B2 * | 3/2005 | Bricaud et al. .............. | 439/326 |
| 7,160,129 B2 | 1/2007 | Yin | |
| 7,270,559 B1 * | 9/2007 | Chen .......................... | 439/326 |

FOREIGN PATENT DOCUMENTS

| TW | 314665 | 9/1997 |
|---|---|---|
| TW | 325154 | 1/1998 |

\* cited by examiner

*Primary Examiner*—Neil Abrams
*Assistant Examiner*—Phuong Nguyen
(74) *Attorney, Agent, or Firm*—Wei Te Chung

(57) ABSTRACT

An electrical card connector (1) includes an insualtive housing (12) receiving a number of terminals (16), a cover (14) pivotally mounted on the insulative housing and moving between an open and a closed position, and two detecting mechanisms. The cover comprises a base portion (141) and a pair of lateral portions (142) extending from opposite sides of the base portion, the insualtive housing and the cover together defines a receiving space. One of the detecting mechanisms (18) is located under one lateral portion of the cover, and the other one of the detecting mechanisms is located at the inside of the receiving space.

17 Claims, 4 Drawing Sheets

ELECTRICAL CARD CONNECTOR

BACKGROUND OF THE INVENTION

BACKGROUND OF THE INVENTION

1. Field of the Invention

The present invention generally relates to an electrical card connector, and more particularly to an electrical card connector having a cover.

2. Description of Prior Art

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multimedia cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card. The memory card, itself, writes or reads via the connector and can transmit between electrical appliances, such as a word processor, personal computer, personal data assistant or the like. The card may be used in applications such as mobile or cellular telephones which are actuated an permit data access after identifying an identification code stored on a subscriber identification module (SIM) card. The SIM card has a conductive face with an array of the contacts, and the mobile phone has a SIM card connector with terminals for electrical connection with the contacts of the SIM card to ensure the subscriber identification confirmation.

U.S. Pat. No. 5,996,891 discloses a SIM card connector as a prior art memory or SIM card connector which comprises an insulative housing with a plurality of terminals retained thereon and a cover pivotally assembled on the insulative housing. In order to know whether the card is located in a right position in the card connector or not, an improved SIM card connector, which installs a detecting mechanism therein, is disclosed by U.S. Pat. No. 6,220,882. However, both patents are silent as to detection of whether the cover is completely closed.

Hence, it is desirable to have an improved card connector to overcome the above-mentioned disadvantages of the prior art.

BRIEF SUMMARY OF THE INVENTION

Accordingly, the object of the present invention is to provide an electrical card connector with a cover, capable of detecting whether the card is at a right position and whether the cover is completely closed, simultaneously.

In order to achieve the above-mentioned object, an electrical card connector comprises an insualtive housing receiving a plurality of terminals, a cover pivotally mounted on the insulative housing and moving between an open and a closed position, and two detecting mechanisms. The cover comprises a base portion and a pair of lateral portions extending from opposite sides of the base portion, the insualtive housing and the cover together defines a receiving space. One of the detecting mechanisms is located under one lateral portion of the cover, and the other one of the detecting mechanisms is located at the inside of the receiving space.

Other objects, advantages and novel features of the invention will become more apparent from the following detailed description of the present embodiment when taken in conjunction with the accompanying drawings.

DETAILED DESCRIPTION OF THE INVENTION

Figure 1:
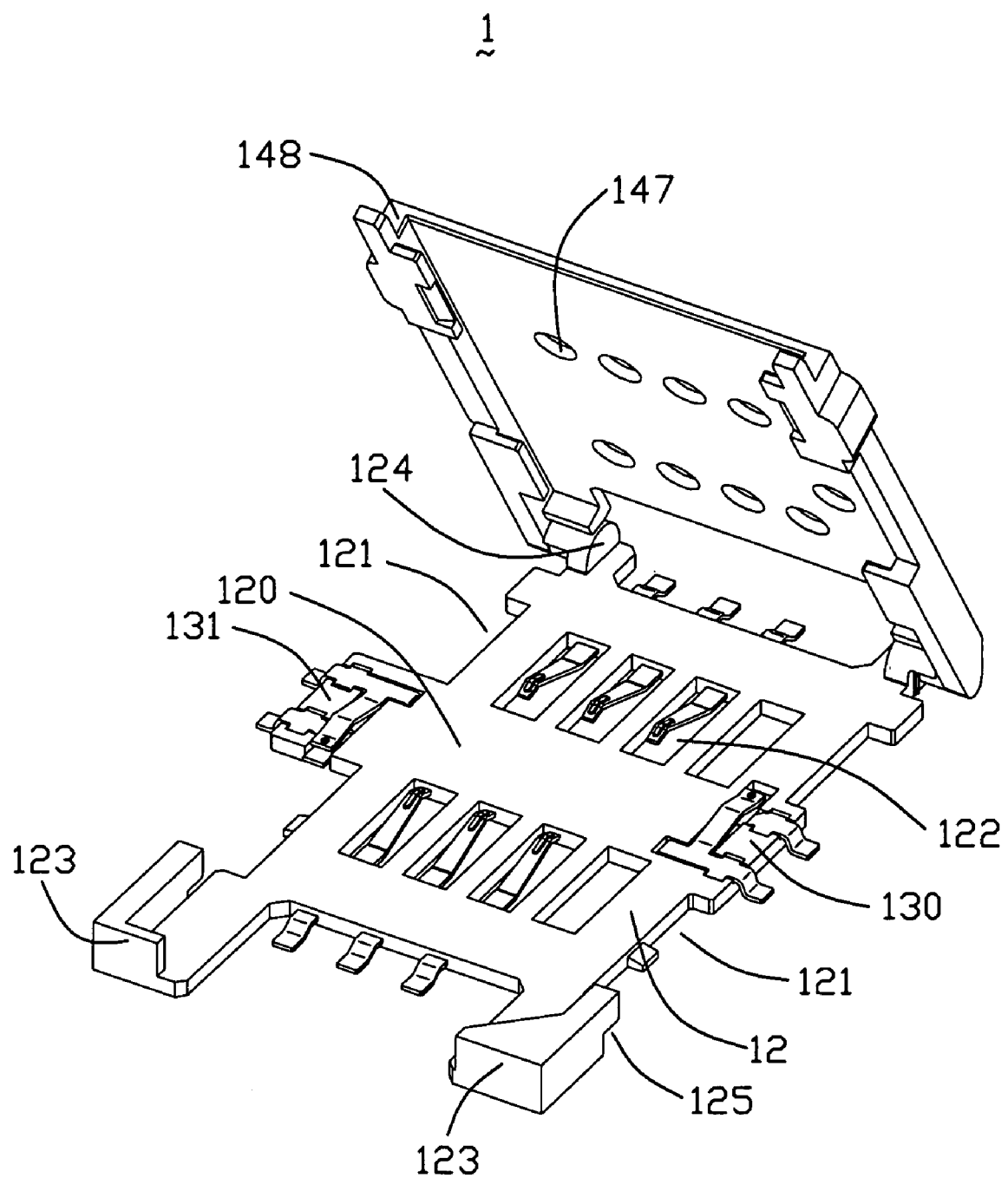
FIG. 1 is a perspective view of an electrical card connector with a cover in an open position in accordance with the present invention.

Reference will now be made to the drawing figures to describe the present invention in detail.

FIG. 1 to FIG. 4 illustrate an embodiment of an electrical card connector 1 mounted on a printed circuit board (not shown), which comprises an insulative housing 12 with a plurality of terminals 16, a cover 14 pivoted thereon for pivotally moving between an open and a closed position via pivot pins 144 thereof, and two detecting mechanisms 18 mounted on the insulative housing 12. The insulative housing 12 and the cover 14 together defines a receiving space (not labeled) for receiving a card.

Figure 2:
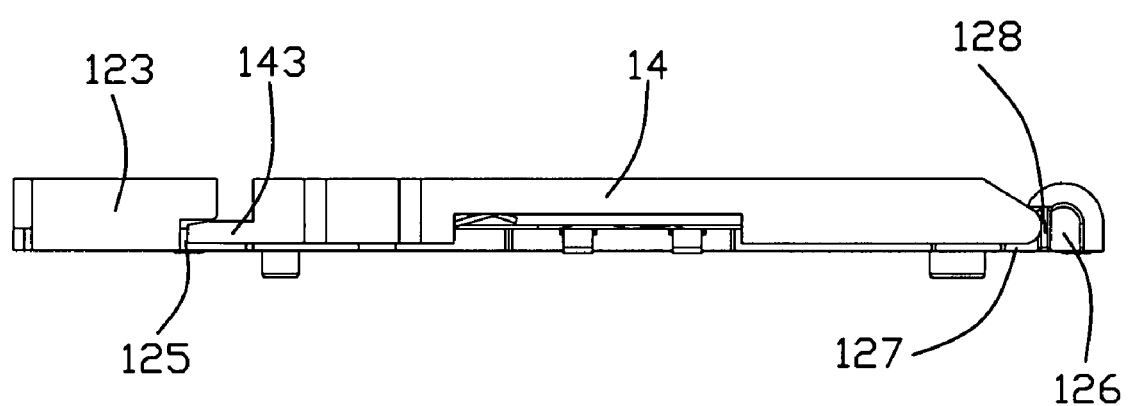
FIG. 2 is a side elevational view of the electrical card connector shown in FIG. 1 with the cover in a closed position.

Specially referring to FIG. 2, the insulative housing 12 comprises a rectangular main body 120, a pair of depressing portion 121 defined at opposite lateral sides of the main body 120, and a plurality of cutouts 122 extending through main body 120 in an up-to-down direction. The main body 120 comprises a pair of stopping blocks 123 at opposite ends of the front end thereof, and a pair of hinge portions 124 at the opposite ends of the rear thereof. Each stopping blocks 123 defines a recess 125 at the outside thereof. The hinge portion 124 comprises a semi-circular receiving cavity 126, a slot 127 defined at the front of and communicating with the receiving cavity 126, and a rib 128 formed between the slot 127 and the receiving cavity 126. The main body 120 further forms a first receiving part 130 and a second receiving part 131, respectively, extending from the lateral sides thereof into the depressing portions 121 for receiving the detecting. The second receiving part 131 projects further than the first receiving part 130, and each receiving part 130, 131 defines a L-shape first slit 132 and a second slit 133. The first slit 132 comprises a vertical slit 136 and horizontal slit 135 communicating with the vertical slit 136. The horizontal slit 135 defines a pair of retaining slits 134. Similarly, the second slit 133, which is parallel with the horizontal slit 135 of the first slit 132, comprises a pair of retaining slit 134. A gap 137 is defined between the main body 120 and the second slit 133.

Figure 3:
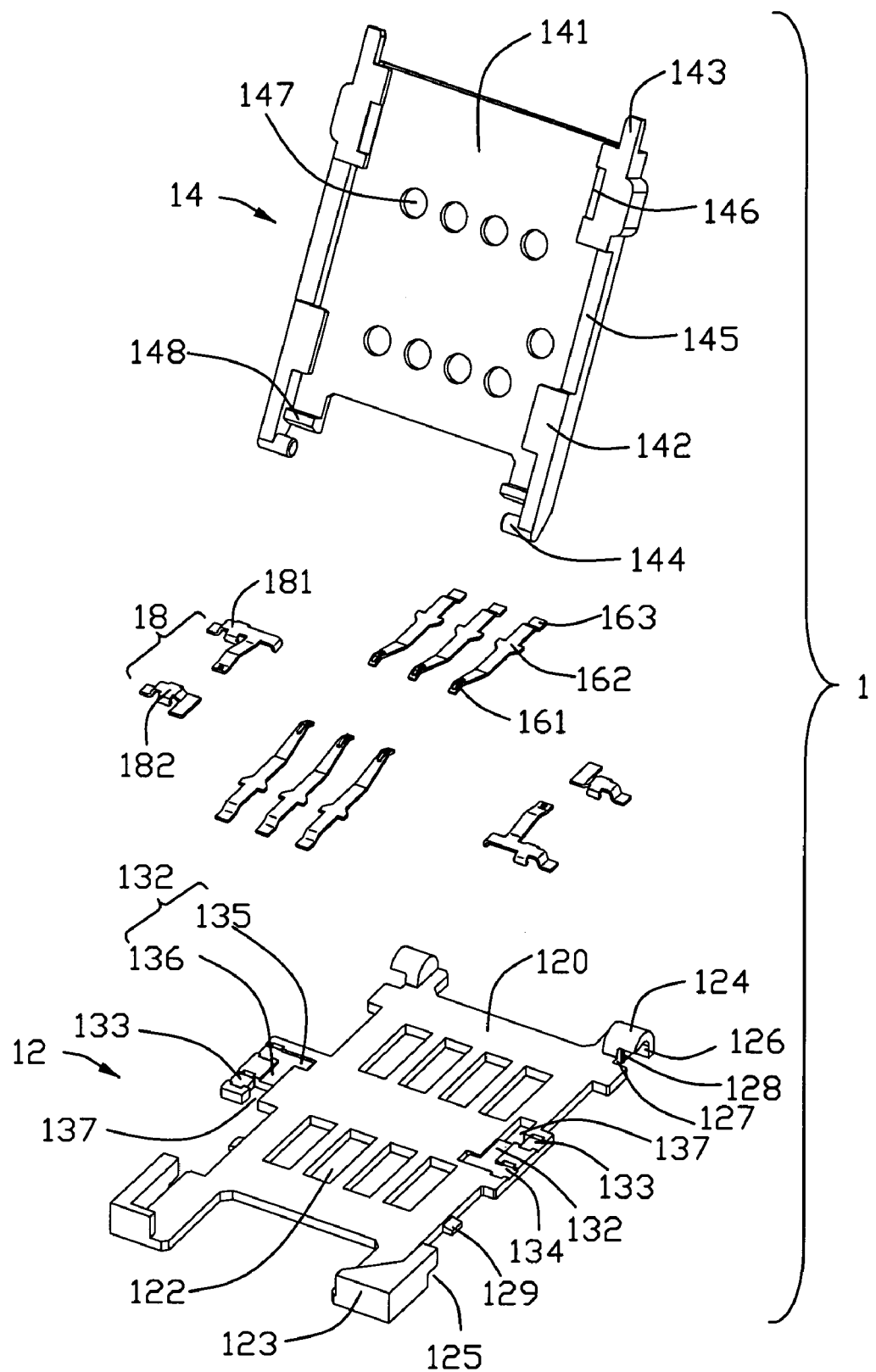
FIG. 3 is an exploded, perspective view of the card connector shown in FIG. 1.

Still referring to FIG. 3, each terminal 16 comprises a contacting portion 161 for contacting with the cad, a soldering portion 163 and a connecting portion 162 connecting the contacting portion 161 and the soldering portion 163. In present invention, the connecting portion 162 is over-molded by the main body 120, the contacting portion projects into corresponding cutout 122, and the soldering portion 163 extends beyond the main body 120.

The cover 14 comprises a base portion 141, and a pair of lateral portions 142 extending from opposite sides of the base portion 141. The base portion 141 comprises a plurality holes 147 overlapped on corresponding contacting portions 161 of the terminals 16, and a pair of holding portions 124 at the rear end thereof. Each lateral portion, which defines a guiding slit 148 for guiding the card inserting, comprises a projecting portion 143 at the front thereof and a hollow 145 corresponding to the receiving piece 130, 131 of the main body 120. The pivot pin 144 is formed at the rear end of the lateral portion. During the cover at the open position, the a pivot pins 144 of the cover are movably received in the receiving cavities 124 of the main body 120. During the cover 14 at the closed position, the pivot pins 144 are located in the slots 127 with the rib prevent the pivot pins from moving backwardly, the hollows 145 meet with corresponding receiving piece 130, 131, and the projecting portions 143 projects into the recesses 125 of the stopping blocks 123.

Figure 4:
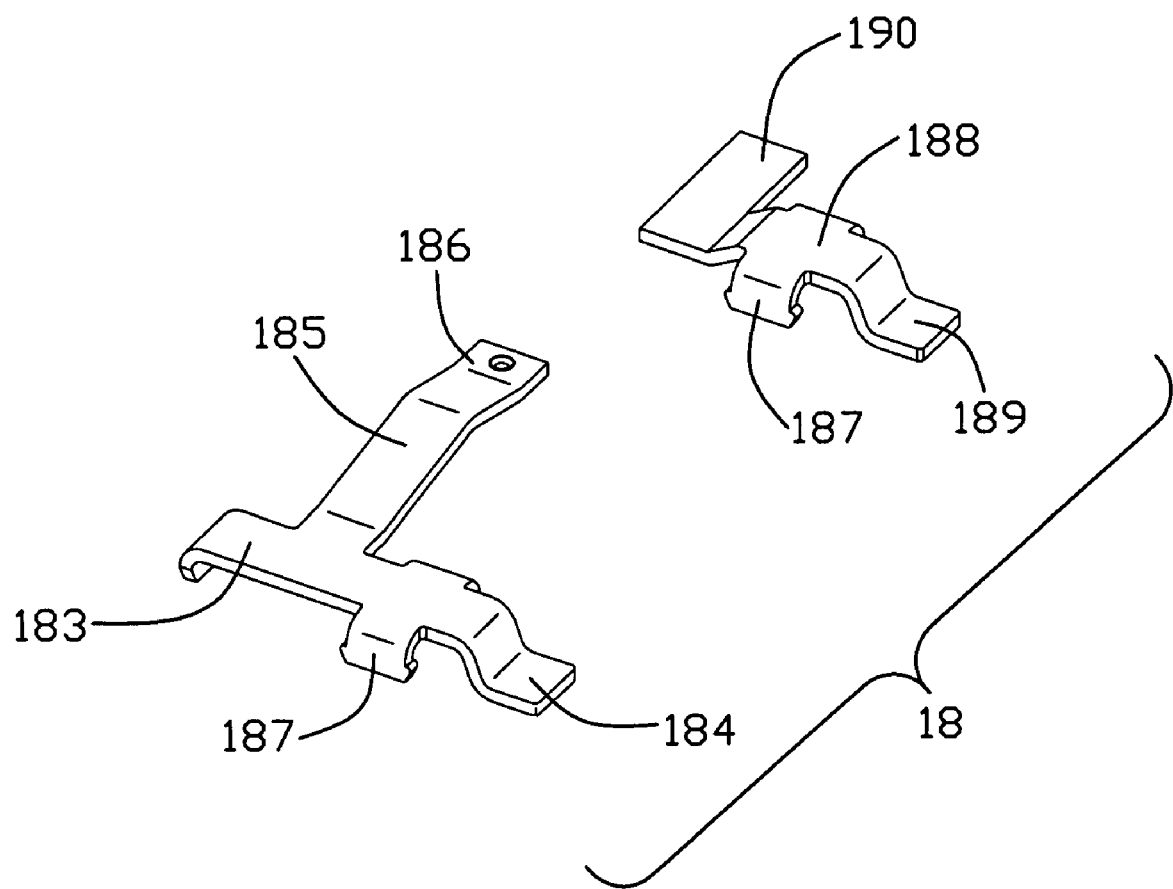
FIG. 4 is in an enlarge view of a detecting mechanism of the electrical connector.

With respect to FIG. 4, each detecting mechanism 18 comprises an active pin 181 and a passive pin 182. The active pin 181 comprises a tail part 184, a beam 183 extending from the tail part 184, a curved resilient part 185 perpendicularly extending from the beam 183, a contacting part 186 extending from a front end of the resilient part 185 and a pair of retention part 187 formed at the opposite sides of the beam 183. The passive pin 182 comprises a soldering part 189, a girder 188 extending from the soldering part 189, a meeting part 190 extending perpendicularly from the girder 188 and a pair of retention part 187 formed at opposite sides of the girder 188. The active pin 181 is received in first slit 132 with the beam 183 located in the horizontal slit 135, the retention parts 187 retained in the retaining slits 134 and the contacting part 185 partially received in the vertical slit 136. The passive pin 182 is received in the second slit 133 with the girder 188 received in the second slit and the retention parts 187 retained in the retaining slits 134. Furthermore, both the contacting part 186 of the active pin 181 and the meeting part 190 of the passive pin 182 are located above the gap 137 of the receiving piece 130/131. Noteworthily, the detecting mechanism 18 received in the second receiving piece 131 is placed under the one lateral portion 142 exactly. When the cover 14 is at a closed position, the resilient part 185 moves downwardly by the cover 14 pressing on, accordingly, the contacting part 186 electrically connecting with the meeting part 190. In another hand, the detecting mechanism 18 received in the first receiving piece 130 is placed at inside of the receiving space, when the card is at a right position, the contacting part 186 electrically connecting with the meeting part 190. Thereby, we can know whether the cover 14 is completely closed and whether the card is at a right position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical memory card connector comprising:
   an insulaltive housing receiving a plurality of terminals;
   a cover pivotally mounted on the insulative housing and moveable between an open position and a closed position, the cover comprising a base portion and a pair of lateral portions extending from opposite sides of the base portion, the insualtive housing and the cover together defining a receiving space; and
   two detecting mechanisms, one of the detecting mechanisms being located under one lateral portion of the cover, and the other one of the detecting mechanisms being located at the inside of the receiving space; the two detecting mechanism being located in a middle area of the base along a front-to-back direction;
   the insualtive housing forms a first receiving piece and a second receiving piece, respectively, extending from lateral sides thereof into depressing portions for receiving the detecting mechanisms;
   the second receiving piece projects further than the first receiving piece, and each receiving piece defines a L-shape first slit and a second slit; the first slit comprises a vertical slit and horizontal slit communicating with the vertical slit the horizontal slit defines a pair of retaining slits; the second slit which is parallel with the horizontal slit of the first slit, comprises a pair of retaining slit; a gap is defined between the insualtive housing and the second slit;
   the two detecting mechanisms comprising a first pin and a second pin, the first pin comprises a tail part, a beam extending from the tail part, a curved resilient part perpendicularly extending from the beam, a contacting part extending from a front end of the resilient part and a pair of retention part formed at the opposite sides of the beam; and the second pin comprises a soldering part, a girder extending from the soldering part, a meeting part extending perpendicularly from the girder and a pair of retention part formed at opposite sides of the girder;
   the beam is located in the horizontal slit, the retention pans are retained in the retaining slits and the contacting part is partially received in the vertical slit;
   the girder is received in the second slit and the retention parts are retained in the retaining slits;
   the contacting part of the first pin and the meeting part of the second pin are overlapped with each other above the gap.

2. The electrical card connector as claimed in claim 1, wherein-the insualtive housing comprises a pair of stop opposite ends of the front end, and each stopping blocks defines a recess at the outside housing.

3. The electrical card connector claim 1, each of the lateral portions, which defines a guiding slit for guiding the card inserting.

4. The electrical card connector as claimed in claim 1, wherein the insulative housing comprises a main body with a plurality of cutouts, and the terminals partially project into the cutouts.

5. The electrical card connector as claimed in claim 1, wherein the first and second pins of the detecting mechanism comprises an active pin and a passive pin.

6. The electrical card connector as claimed in claim 5, wherein the insualtive housing comprises two receiving pieces receiving the two detecting mechanisms.

7. The electrical card connector as claimed in claim 5, wherein the insulative housing comprises a first slit receiving the active pin and a second slit receiving the passive pin.

8. The electrical card connector as claimed in claim 1, wherein the insualtive housing comprises a pair of hinge portions at the opposite ends of the rear and the hinge portion comprises a semi-circular receiving cavity.

9. The electrical card connector as claimed in claim 8, wherein the insulative housing comprise a slot defined at the front of and communicating with the receiving cavity, and a rib formed between the slot and the receiving cavity.

10. The electrical card connector as claimed in claim 9, wherein the cover comprises the pivot pins, the pivot pins being formed at the rear end of the lateral portion.

11. The electrical card connector as claimed in claim 10, wherein the pivot pins being movable received in the receiving cavities.

12. An electrical connector assembly comprising:

an insulative stationary base;

a plurality of contacts disposed in the base with contacting portions extending upwardly above the base;

a cover associatively moveable with regard to the base and cooperating with the base to commonly define therebetween a card receiving space in which a SIM card is allowed to be inserted;

a switch located on a middle edge region of the base so as to be activated by a side region of at least one of the cover and the SIM card when said cover is moved to an intimate position with regard to the base;

the insulative stationary base forms a first receiving piece and a second receiving piece, respectively, extending from lateral sides thereof into depressing portions for receiving the switch;

the second receiving piece projects further than the first receiving piece, and each receiving piece defines a L-shape first slit and a second slit; the first slit comprises a vertical slit and horizontal slit communicating with the vertical slit; the horizontal slit defines a pair of retaining slits; the second slit which is parallel with the horizontal slit of the first slit, comprises a pair of retaining slit; a gap is defined between the insulative stationary base and the second slit;

the switch comprising a first contact and a second contact, the first contact comprises a tail part, a beam extending from the tail part, a curved resilient part perpendicularly extending from the beam, a contacting part extending from a front end of the resilient part and a pair of retention part formed at the opposite sides of the beam; and the second contact comprises a soldering part, a girder extending from the soldering part, a meeting part extending perpendicularly from the girder and a pair of retention part formed at opposite sides of the girder;

the beam is located in the horizontal slit, the retention parts are retained in the retaining slits and the contacting pan is partially received in the vertical slit;

the girder is received in the second slit and the retention pans are retained in the retaining slits;

the contacting pan of the first contact and the meeting pan of the second contact are overlapped with each other above the gap.

13. The connector as claimed in claim 12, wherein said cover is pivotal with regard to the base.

14. The electrical card connector claim 12, wherein each of the lateral portions, which defines a guiding slit for the card inserting.

15. The connector as claimed in claim 12, wherein said switch is located in an outermost area of the base in a lateral direction.

16. The connector as claimed in claim 12, wherein said switch is activated when said cover is moved to a final closed position with regard to the base.

17. The connector as claimed in claim 12, wherein said cover defines a notch corresponding to said switch.

* * * * *